Nov. 21, 1933.   W. F. FOLMER ET AL   1,936,468
INSECT EXTERMINATOR
Filed Feb. 4, 1931   4 Sheets-Sheet 3

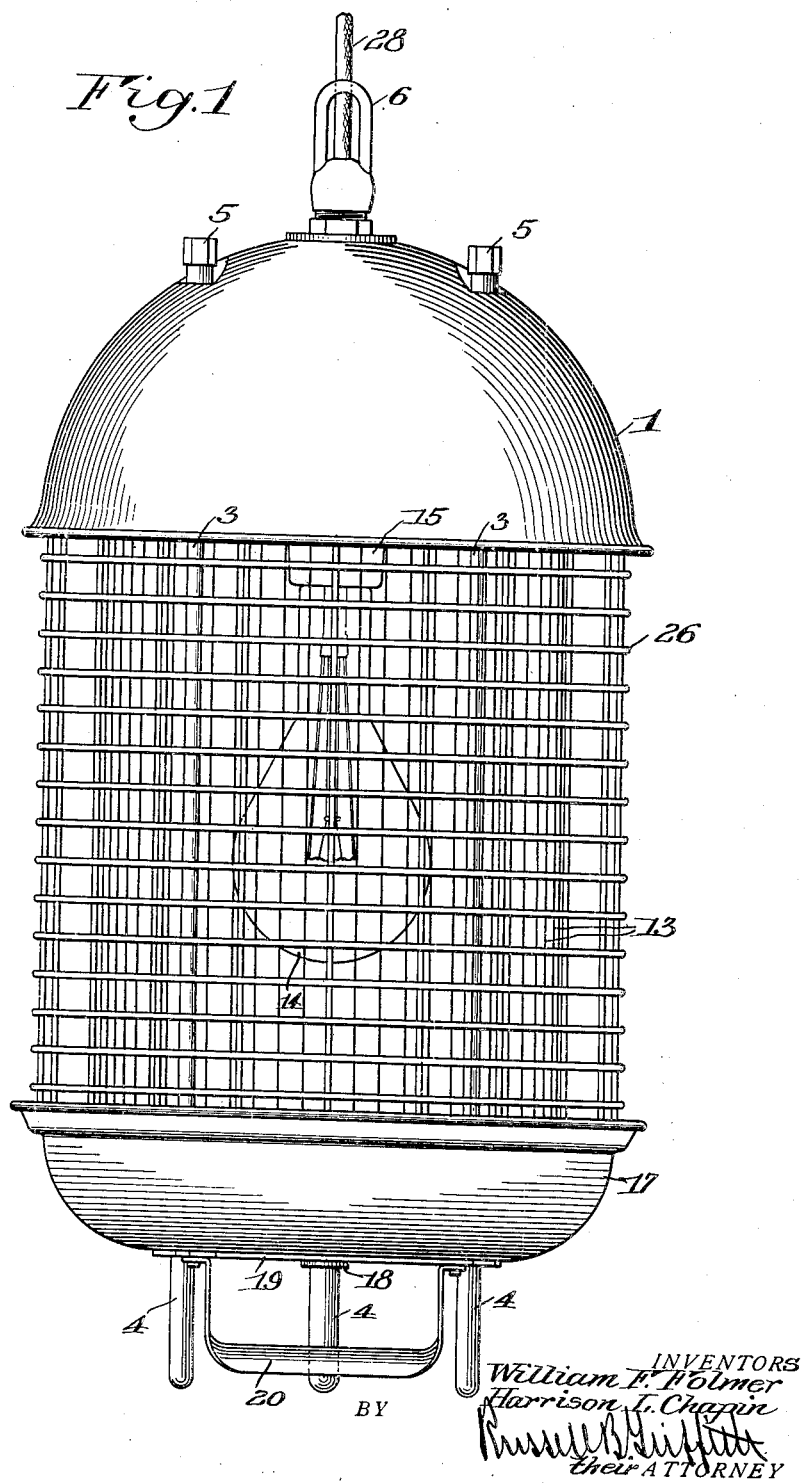

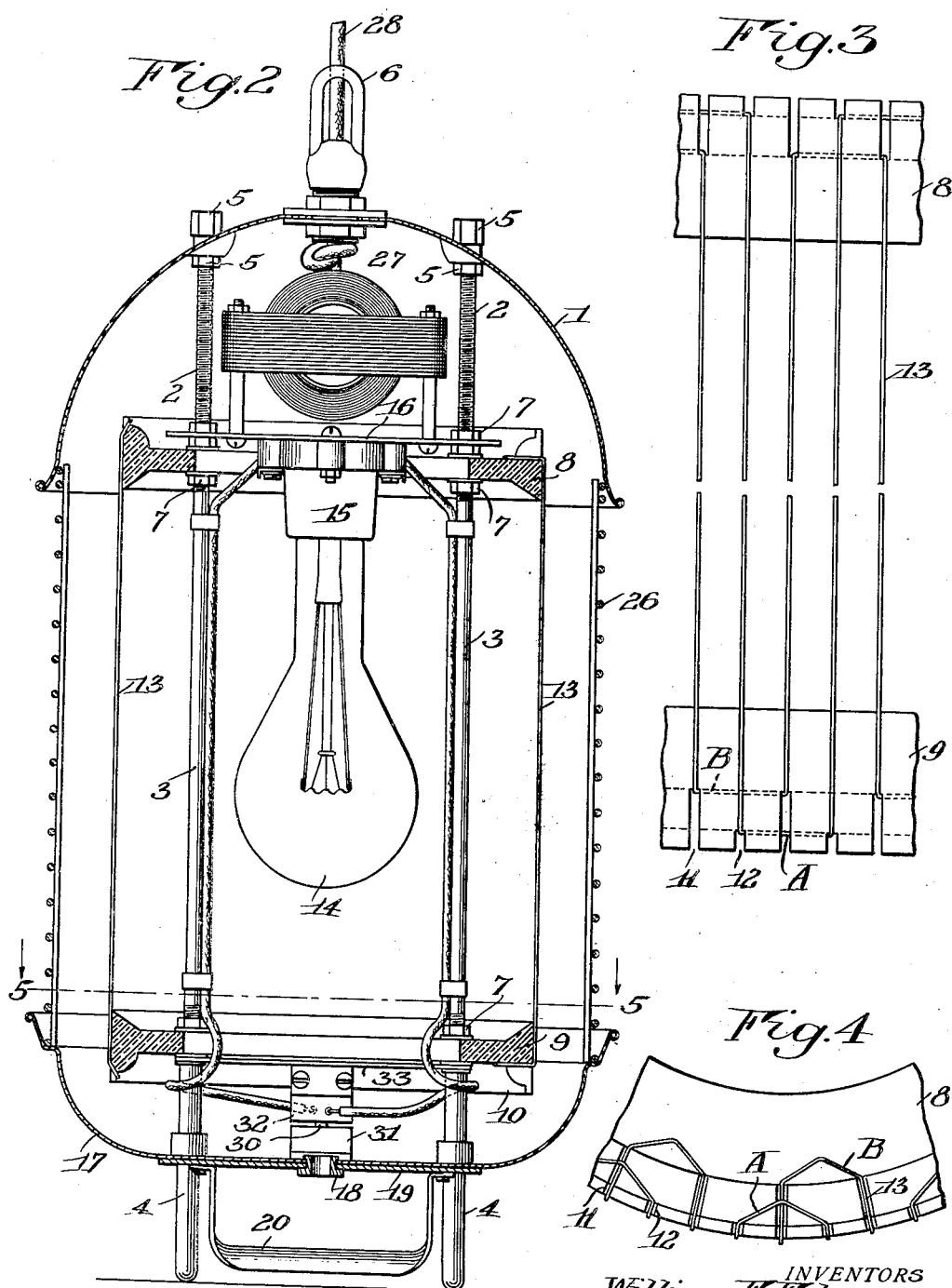

INVENTORS
William F. Folmer
Harrison L. Chapin
BY
their ATTORNEY

Nov. 21, 1933.  W. F. FOLMER ET AL  1,936,468
INSECT EXTERMINATOR
Filed Feb. 4, 1931  4 Sheets-Sheet 4

INVENTORS
William F. Folmer
Harrison L. Chapin
BY
Their ATTORNEY

Patented Nov. 21, 1933

1,936,468

UNITED STATES PATENT OFFICE 1,936,468

INSECT EXTERMINATOR

William F. Folmer and Harrison L. Chapin, assignors to Folmer-Chapin Corporation, Rochester, N. Y., a corporation of New York Application February 4, 1931. Serial No. 513,272

6 Claims. (Cl. 43—112)

Our present invention relates to electrical devices and has for its object to provide a simple, attractive and safe high voltage means adapted for use on ordinary lighting circuits for destroying insects by electrocution or incineration, particularly night-flying insects injurious to vegetation. The improvements are directed in part toward the arrangement of a lamp, by the illumination of which the insects are attracted to the device aid come in contact with the charged wires, which latter, however, cannot become dangerous to a person manipulating the lamp itself.

To these and other ends, the invention resides in certain improvements and combinations of parts, all as will be hereinafter more fully described, the novel features being pointed out in the claims at the end of the specification.

In the drawings:

Fig. 1 is a front elevation of an insect exterminator constructed in accordance with and illustrating one embodiment of our invention;

Fig. 2 is a vertical central section therethrough leaving certain interior parts in elevation;

Fig. 3 is an enlarged fragmentary elevation of a few of the high tension wires (broken away) and their supporting insulating rings;

Fig. 4 is a fragmentary enlarged end view illustrative of the manner in which the high tension wires are secured to the insulators;

Figure 5:
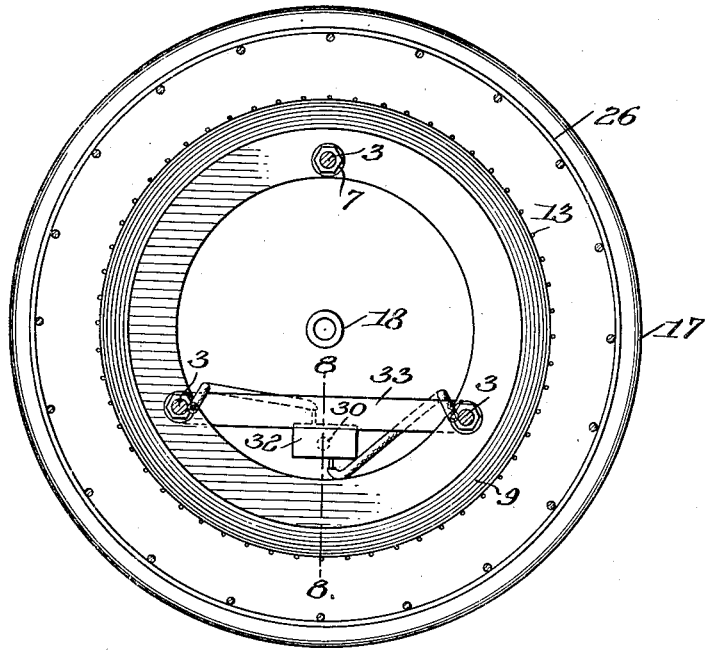
Figure 6:
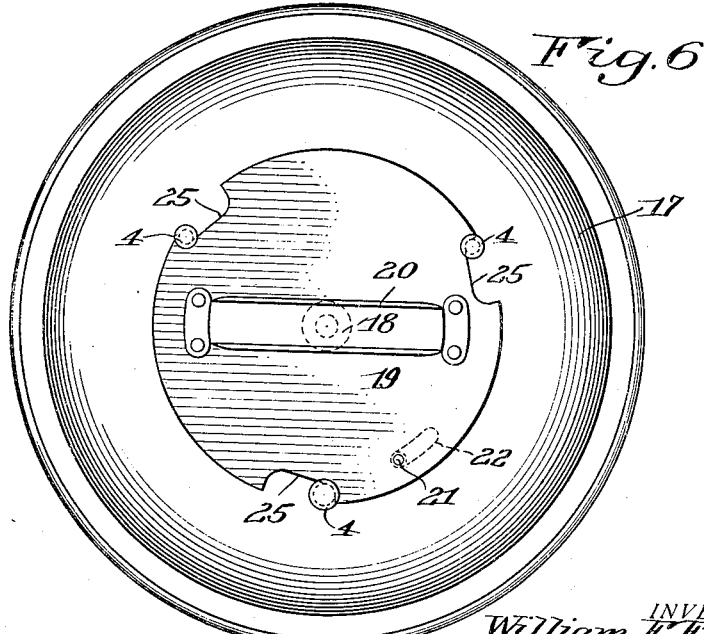
Figure 7:
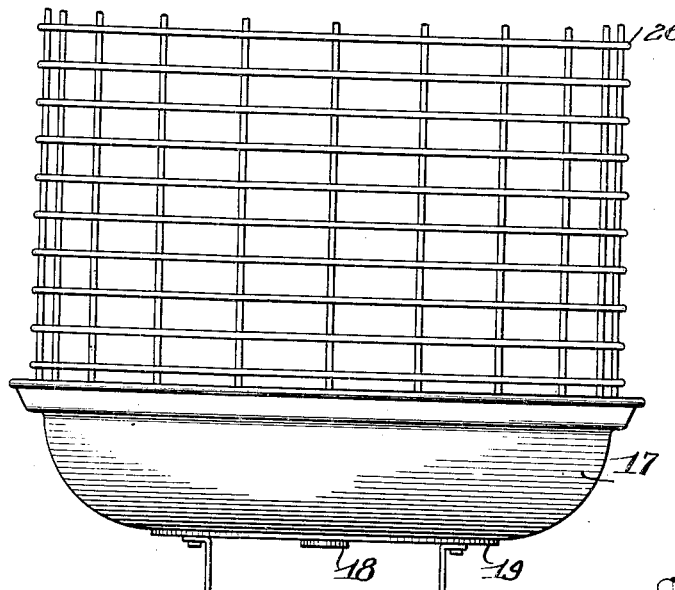
Figure 8:
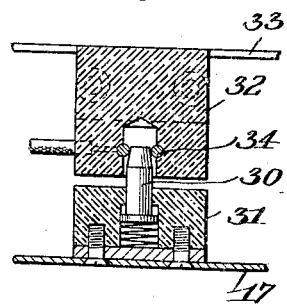
Figure 9:
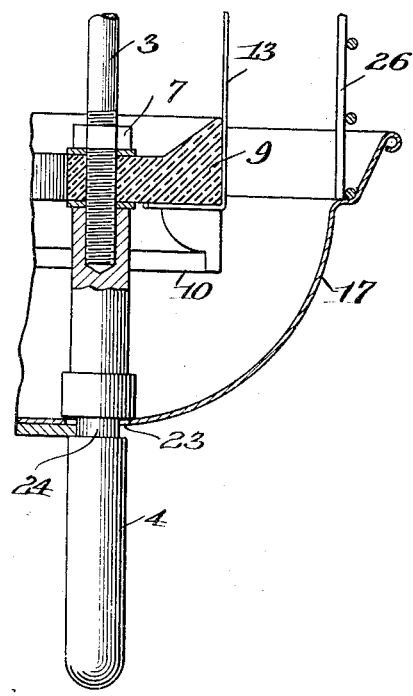
Figure 10:
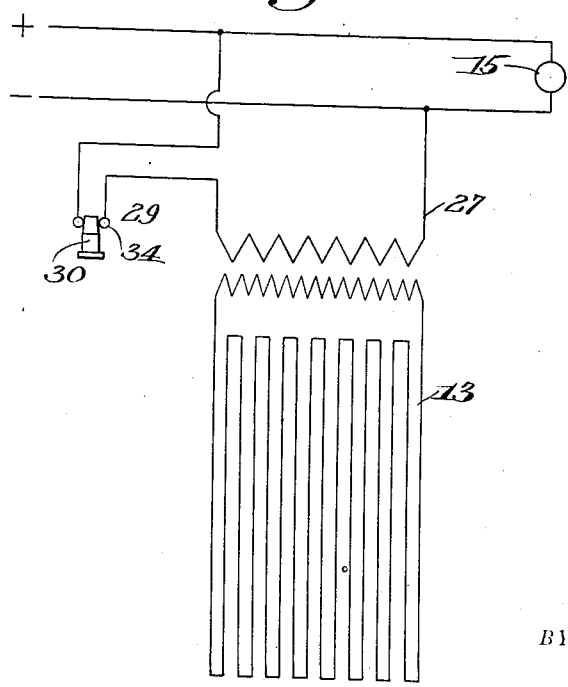

Fig. 5 is a horizontal section taken on the line 5—5 of Fig. 2;

Fig. 6 is a bottom plan view;

Fig. 7 is a side view of the under pan with the grid or guard carried thereby partly broken away, these elements being shown separated from the rest of the structure;

Fig. 8 is an enlarged section of the high tension switch or circuit breaker taken on the line 8—8 of Fig. 5;

Fig. 9 is an enlarged fragmentary sectional view partly in elevation through one of the supports and adjacent parts, and Fig. 10 is a diagrammatic view of the electric circuit arrangements.

Similar reference numerals throughout the several views indicate the same parts.

To first give a general idea of our device as disclosed by the present particular embodiment of the invention, it has the general form of a lantern that may be suspended from trees, porches and other available places, but which may also be set out on a lawn if desired, according to whether the intention is to destroy moths and the like or flies and mosquitoes. It will attract and destroy both in most any outdoor spot, but its particular utility is in protecting fruit trees, taking the place of the usual spraying and with much more effective results. The orchard is wired, for instance, with the usual one hundred and twenty volt line which, through a transformer built into the device, is stepped up to preferably 3500 volts. The charged wires run between upper and lower insulating rings and enclose an electric lamp bulb that may be inserted and removed from the bottom, but in order to gain access to the lamp, a pan at the bottom in which the dead insects are collected must be removed, and the removal of this piece automatically and unavoidably breaks the high tension circuit. Further, a grid or guard encases the charged wires to prevent human contact and also to prevent the destruction or injury of birds, although openings are provided sufficient to admit the insects.

Referring more particularly to the drawings, 1 indicates a preferably semi-spherical cap or top piece to which are secured at their upper threaded ends 2 a plurality (in the present instance, three) of standards, supports or connecting members 3. The lower ends of these supports terminate in legs 4 adapted to rest on the ground when the device may be best used in this position, as when it is desired, for instance, to rid a lawn of flies or mosquitoes. The said threaded ends 2 and the cap 1 are secured together by lock nuts 5 and a suitable connection, such as an eye 6, is affixed to the apex or dome of the cap 1 from which the device is suspended when desired, as, for instance, in hanging the exterminator from fruit trees or supporting lines in an orchard.

Secured in vertical spaced relationship to the supports 3 by lock nuts 7 are upper and lower insulating or dielectric rings 8 and 9. As shown in detail in Fig. 9, the legs 4 are not in one piece with the connecting supports 3 but are screwed to the lower ends of the latter in opposition to the lower lock nuts 7 to grip and hold the lower insulating ring 9. These rings are preferably of the contour shown in section in Figs. 2 and 9, and outer circumferential flanges 10 thereof are pierced by alternate deep and shallow radial slots 11 and 12. Looped about the projections formed by these slots are the strands 13 of the high tension or high voltage wire, the strands being preferably substantially parallel and spaced apart a distance sufficient to bring the charged zones surrounding them in the proper proximity to cause a winged insect to receive through its anatomy the killing voltage with which the wires are charged through means hereinafter described.

It will be observed, particularly by an inspection of Figs. 3 and 4, that the slotting 11—12 of the insulator rings 8—9 permits a continuous wire to be looped back and forth with the anchoring loops spaced apart as they lie on the insulator to a degree as great as that which obtains in the separation of the extended parallel strands. In other words, still referring to Figs. 3 and 4, the loop A passed around through the shallow slots 12 is amply spaced from the loop B passed around through the deeper slots 11 and arcing is prevented.

The attraction for these night flying, injurious and pestilent insects exists in an illuminant housed within the cage formed by the high tension strands 13. In the present instance, this is provided in the form of the ordinary filament electric light bulb 14 supported in a central socket 15 depending from a mounting plate or stage 16 supported above the ring 8 on the connecting standard 3. This light is accessible for manipulation through the bottom of the cage in the following manner:

Supported on the legs 4 beneath the lamp is a pan 17. Attached to the under side thereof by a grommet pivot 18 (Figs. 2 and 6) is a rotary disc 19 having a handle 20 and the movement of which is limited by a pin 21 working in an arcuate slot 22 in the pan. Apertures 23 in the latter admit the legs 4 (Fig. 9), which latter are provided with reduced portions 24 providing opposed shoulders. The disc 19 has cutaway portions 25 in the region of the legs and when the said disc is rotated by means of its handle, it, in one direction, interlocks with these shoulders and in the other direction releases therefrom. In the first instance, the pan is locked in position to catch the bodies of the dead insects, and by the latter means it is removed to empty and dispose of them.

In the domestic use of our invention, as, for instance, on porches and lawns, where humans are about, particularly children, it would, of course, be dangerous to have the high voltage wires exposed to contact. On the other hand, during use in orchards, inoffensive birds must be protected from accidental injury. For these purposes, I provide outside of and encircling the high voltage cage 13 a grid or guard 26 of a nature suitable to perform these functions and yet admit the insects, the destruction of which is intended. In the present embodiment of the invention and as one feature thereof, we provide a cylindrical wire cage, as shown, which is supported by and attached to and removable with the pan 17, as shown in detail in Fig. 7. Its upper end cooperates with the dome or cap 1 and is braced thereby though not attached thereto.

As aforesaid, the lamp 14 is accessible only through the removal of the pan 17 in the manner described, and it is obvious that once the pan is removed and the guard with it, the high voltage wires 13 become exposed, both from the interior and the exterior. As a measure of constant safety in guarding against injury from these wires by the attendant, we make provisions whereby the removal or detachment of the pan and guard automatically breaks the circuit through the high voltage wires 13 and renders the device harmless to human touch. In order to explain this function, it is necessary to explain our preferred arrangement of the electrical circuits, through which the exterminator operates.

As heretofore stated, our device is designed to operate upon the ordinary one hundred and twenty volt lighting circuit, and as also heretofore stated, it seems desirable in consequence of our developments that the voltage in the wires 13 should approximate thirty-five hundred. While the electrocution of humans is conducted with a voltage of somewhere around twenty-one hundred, it seems that the anatomy of insects, contributed particularly by the structure of their wings, is dielectrically greater. It is, therefore, necessary to step up the ordinary line voltage, which act we accomplish through the use of a transformer incorporated in the device.

This is indicated generally at 27 in Fig. 2. The line wire 28 associated with the suspending means, if any (but not shown), feeds both the transformer and the direct one hundred and twenty volt circuit through the lamp 14, in accordance with the diagram of Fig. 10, in which it is shown that the wires 13 constitute the induction field of the transformer 27. Complete explanation of the circuits shown in this diagram is thought unnecessary, except to the extent of pointing out a switch or circuit breaker 29 in the circuit of the transformer, individually, that opens the circuit thereof when the pan 17 is removed and with it the guard 26 fixed thereto. This circuit breaker is best shown mechanically and in detail in Figs. 5 and 8. A spring pressed contact plunger 30 mounted in an insulating block 31 on the pan 17, when the latter is in its operative and assembled position, engages in a socket 32 on a bridge piece 33 on the supports and makes contact with a terminal wire 34 of the circuit through the transformer. It is obvious, therefore, that when the pan 17 and guard 26 are removed as a unit, this circuit is broken and the induction from the transformer to the wires 13 is destroyed, rendering the electric cage inert.

We claim as our invention:

1. In an insect electrocuting device, the combination with a pair of upper and lower insulating rings, of wires extending longitudinally between them in spaced relationship, high tension circuit connections for the wires, an electric lamp socket within one of the rings, rigid supports connecting the rings within the cage formed by the wires, said supports extending beyond the lower ring to constitute legs, and a pan removable and replaceable on the legs beneath the lamp socket.

2. In an insect electrocuting device, the combination with a pair of upper and lower insulating rings, of conductors extending between them in spaced relationship in the form of a cage, high tension circuit connections for the conductors, a lure within the cage, rigid supports connecting the rings within the cage formed by the conductors, a removable and replaceable pan arranged beneath the lower ring, and a circuit breaker in the high tension circuit operated by the removal of the pan.

3. In an insect electrocuting device, the combination with a pair of upper and lower insulating rings, spaced conductors extending between the same in the form of a cage, and high tension circuit connections for the conductors, of a lamp within the cage formed by the conductors and accessible through the lower ring, a detachable and replaceable pan adjacent to the lower ring beneath the lamp, and a circuit breaker in the high tension circuit operated by the removal of the pan.

4. In an insect electrocuting device, the combination with a supporting structure embodying spaced, high tension conductors constituting a cage, and a high voltage circuit therefor, of an insect attracting lure within the cage, a separate removable encompassing guard for the cage, and a removable pan beneath the lure attached to the supporting struture and carrying the guard.

5. In an insect electrocuting device, the combination with a supporting structure embodying spaced, high tension conductors constituting a cage, and a high voltage circuit therefor, of an insect attracting lure within the cage, a detachable encompassing guard for the cage, and a breaker for the circuit operated upon the removal of the guard.

6. In an insect electrocuting device, the combination with a supporting structure embodying spaced, high tension conductors constituting a cage, and a high voltage circuit therefor, of an insect attracting lure within the cage manually accessible only from the bottom thereof, a closure for the bottom of the cage, and a breaker for the said circuit operated upon the removal of the closure.

WILLIAM F. FOLMER.
HARRISON L. CHAPIN.